United States Patent [19]
Borer
[11] 3,720,846
[45] March 13, 1973

[54] INTEGRATING AMPLIFIER CIRCUITS

[75] Inventor: Alan John Borer, Crowborough, England
[73] Assignee: Servomex Controls Limited, Crowborough, England

[22] Filed: June 4, 1971
[21] Appl. No.: 150,153

[52] U.S. Cl. ....................307/238, 307/265, 330/9
[51] Int. Cl. ....................H03k 5/00
[58] Field of Search ....................307/238, 265; 330/9

[56] References Cited

UNITED STATES PATENTS 3,541,320 11/1970 Beall ....................330/9
3,562,673 2/1971 Caspari ....................330/9
3,200,338 8/1965 Ellis ....................330/9
3,491,253 1/1970 Glass ....................307/238
2,999,168 9/1961 Henry ....................307/265
3,139,590 6/1964 Brown ....................330/9
3,252,105 5/1966 Patchell ....................330/9

*Primary Examiner*—James W. Lawrence
*Assistant Examiner*—Harold A. Dixon
*Attorney*—Holcombe, Wetherill & Brisebois

[57] ABSTRACT

An integrating amplifier circuit is provided which overcomes the problem of input voltage offset and enables a cheaper amplifier to be employed in a given situation. Input circuits are disclosed which behave as current generators to achieve the desired result.

6 Claims, 4 Drawing Figures

INVENTOR

BY

ATTORNEY

INTEGRATING AMPLIFIER CIRCUITS

This invention relates to amplifier circuits, and has particular application to low input current amplifier circuits employing integrating amplifiers.

Integrating and other amplifier circuits are subject to errors arising from input voltage offset, and as this is a variable factor, it has serious effects on the accuracy of the circuit.

According to the present invention, the input of an amplifier circuit is fed from an input circuit whose behavior approximates to that of a current generator in that load voltage has negligible effect upon the accuracy to which the load current may be known.

The input circuit is one form of the invention comprises a pulse width modulator feeding an integrating amplifier via a switch which is arranged to be closed only during a relatively short signal period in each signal-space cycle, so that in the space periods the potential of the amplifier input can float freely.

Any suitable switch may be used. In a ramp generator according to the invention a reference signal is fed to the input circuit, which produces an output which drives an integrating amplifier to produce an output ramp of corresponding gradient.

In one current measuring circuit according to the invention the "electrometer" current to be measured is in use connected directly to the amplifier input, and the output of the circuit is also fed back to cause the current generator to feed to the integrator input a current which will balance the electrometer current, thereby balancing the whole system for the given electrometer current.

In an alternative current measuring circuit according to the invention, the independence of the load current from the load voltage may be achieved by allowing the input current to charge a capacitor which is connected to the input of an amplifier whose output in turn acts to discharge the capacitor. The charge taken from the capacitor may be calculated in terms of the amplifier output immediately before and immediately after discharge so that the quantity is known independently of input voltage offset.

Figure 1:
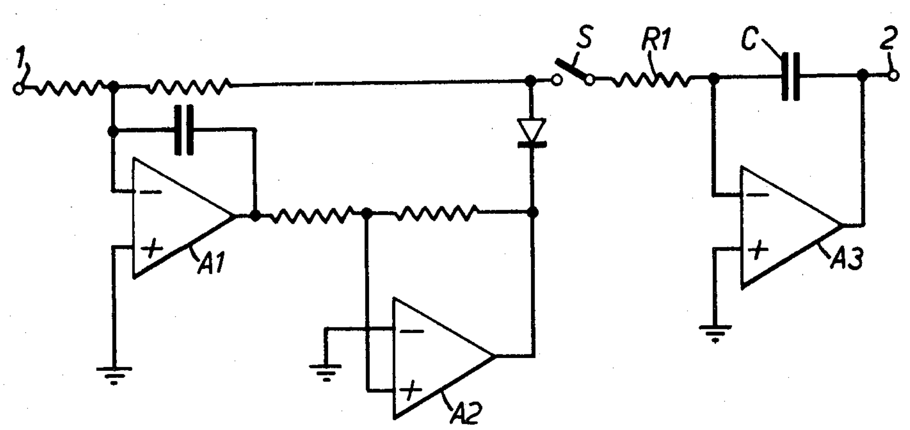
Figure 2:
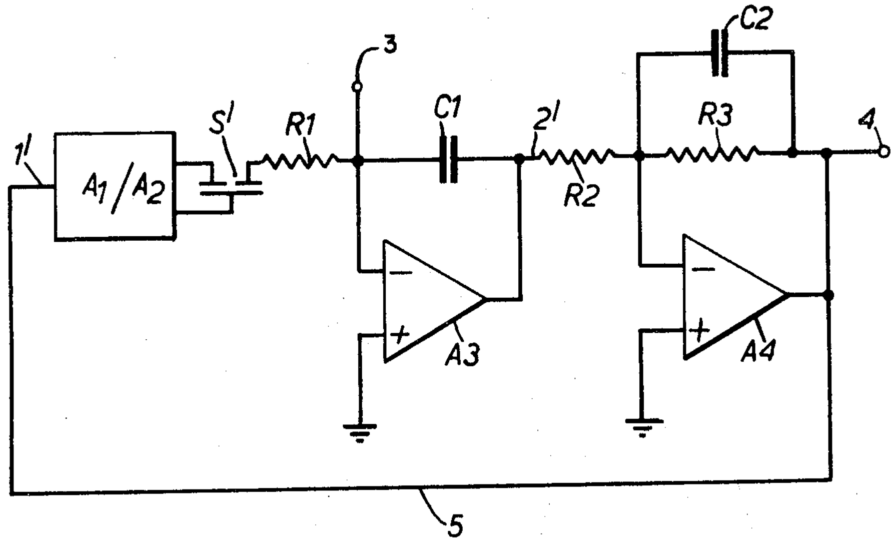
Figure 3:
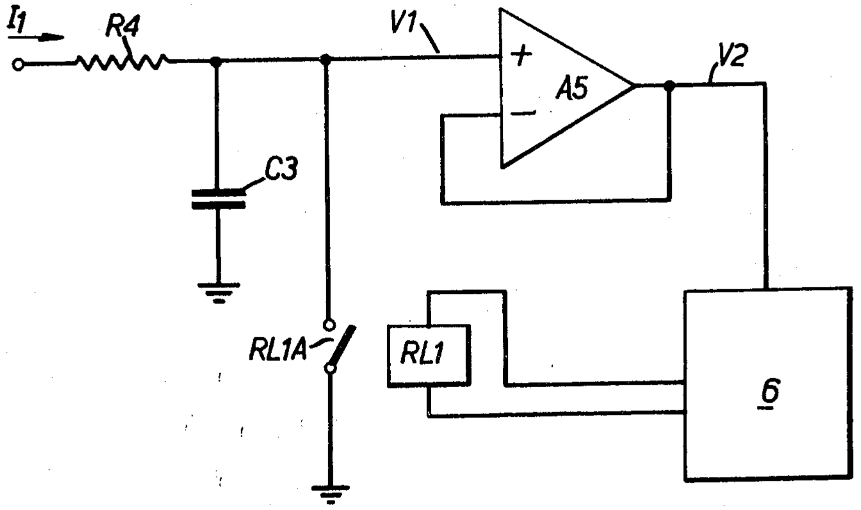
Figure 4:
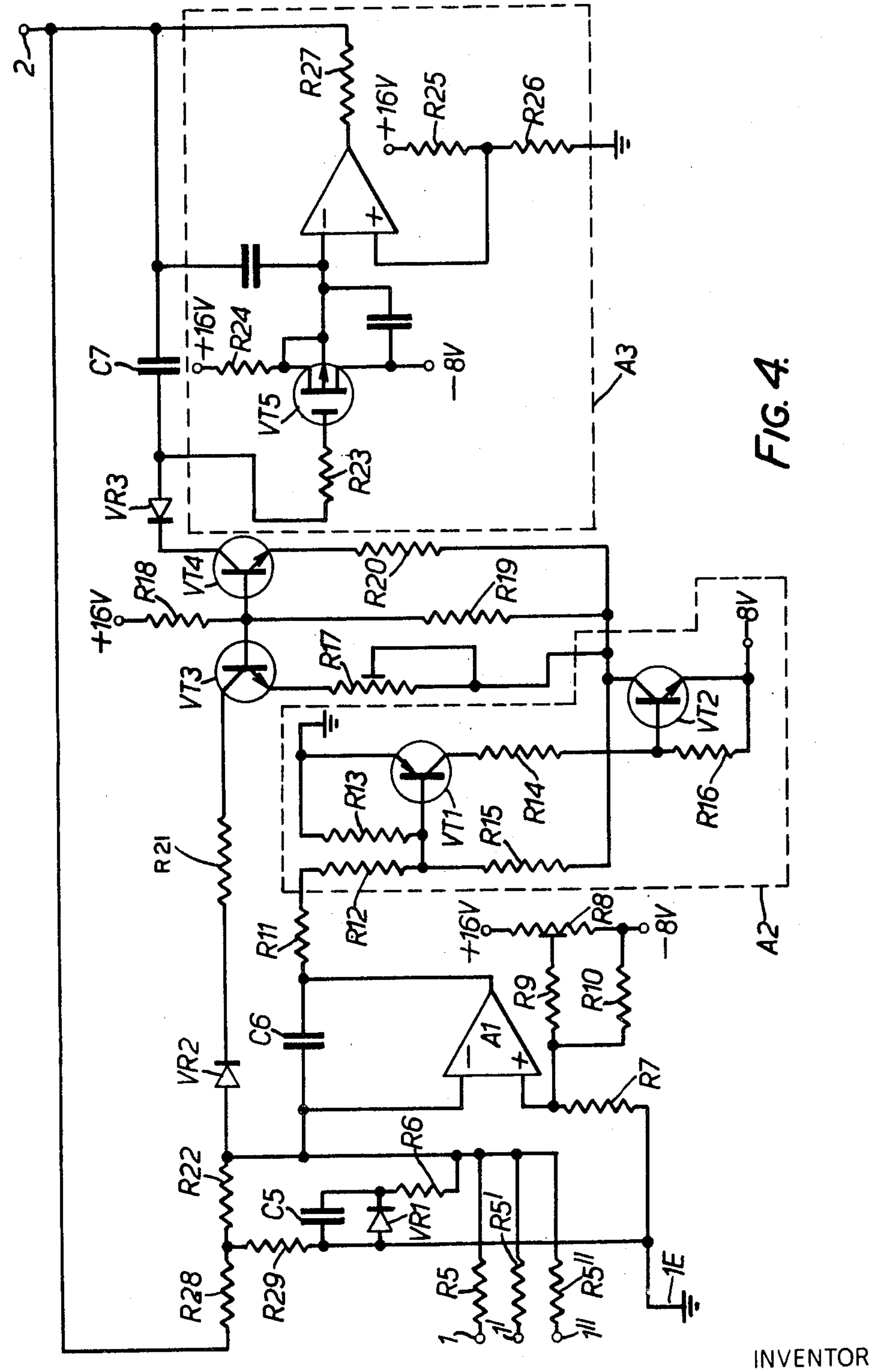

The invention will now be described in greater detail with reference to the accompanying drawings, of which:

FIG. 1 is a circuit diagram of an amplifier circuit constructed in accordance with the invention to function as a voltage ramp generator, FIG. 2 is a circuit diagram of an electrometer amplifier based on the circuit of FIG. 1, FIG. 3 is a circuit diagram of an electrometer circuit constituting a further embodiment of the invention, and FIG. 4 is a detailed circuit diagram corresponding to the schematic diagram of FIG. 1.

The circuit of FIG. 1 can be considered as a pulse width modulator disposed on the left-hand side of an on/off switch means S and an integrator disposed on the right hand side of the switch means. The pulse-width modulator has an input terminal 1 which is connected to an amplifier A1 and a Schmitt trigger A2 in such a manner that the output of the modulator is a square pulse train having a mark-space ratio proportional to the voltage applied to the input terminal 1. Such circuits are known, and no more detailed description will be given here. The integrator consists of an amplifier A3 having an input resistor R1 connected to the switch means S and a feedback capacitor C1 so chosen that, if $V_1$ and $V_2$ are the input and output voltages respectively of the integrator circuit, then $$V_2 = -(1/RC) \int V_1\, dt.$$

If $V_1$ were constant, $V_2$, appearing on terminal 2, would be a steadily rising voltage ramp, but in FIG. 1, assuming switch means S to be conducting, the output takes the form of a stepped ramp, having relatively sharply rising portions corresponding to the "mark" periods of the modulator output, separated by ideally level portions corresponding to the "space" periods. With suitable component values and a sufficiently high pulse repetition frequency, the stepped ramp can rise at an effectively steady rate, comparable to the output from the same integrator when fed with a suitable steady voltage.

However, the output signal, whether from the circuit of FIG. 1 or from a simple integrator, is subject to errors, inter alia from the offset of amplifier A3. If, for Example, $C = 1\ \mu F$
$R = 1 M\Omega$
$V_1 = -10 mV$
$V\text{offset} = \pm 7 mV$ then $V_2$ will rise at an average rate of $(10 \pm 7)$mV per sec., which may lie anywhere between 3 and 17 mV per sec. If however the switch means S is arranged to be rendered non-conductive during the space periods, the significant information contained in the rising portions of the ramp is retained, while during the space periods the input of amplifier A3 can float in potential so that the amplifier balances itself with zero output increment, thereby eliminating the effect of offset for these periods. The error introduced by the amplifier offset is thus reduced on average by a factor equal to the ratio (mark period)/(mark period + space period). By making the mark-space of the order of $1 : 10^4$, this reduces the error from ±7mV/sec. to some 0.7 μV/sec., with a further possible error of approximately 70nV/sec. if the switch device has a resistance of the order of 10 Ωin its non-conducting condition. It will thus be seen that the circuit described offers considerable improvement in accuracy over a straightforward integrator.

In the circuit of FIG. 2, the pulse width modulator is diagrammatically indicated at A1/A2, with an input lead 1' and a field effect transistor S' used as the switch S. The output of the integrator amplifier A3 is fed via a resistor R2 to the input of an amplifier $A_4$ having a feedback path R3C2. Analogue output signals are taken from an output terminal 4, and these signals are also fed back on a lead 5 to the input 1' of the modulator A1/A2. The input 3 to the circuit, for connection to an input current, is connected to the junction of R1 and C1.

In operation, the circuit parameters are so chosen that for a constant signal on terminal 3, the output at 4 is constant. This output is thus a measure of the degree of feedback which is necessary on line 5 to produce a mean current through R1 to balance the current entering the R1C1 junction from terminal 3, thus maintaining the integrator output constant. Because of the virtual elimination of offset error in A3, the accuracy of this circuit is good.

It will be readily appreciated that the pulse width modulator and switch S, S' in the circuits of FIGS. 1 and 2 behave in effect as current generators, since on average they have only a negligible constraining effect on the voltage conditions at the input of respective amplifiers A3. It is feasible to consider the employment of other current generators whose output can be made a function of an input signal. Such as:

a. a photo-emissive diode energizing a photo-detector.
b. a pentode valve circuit.
c. electrostatic systems.

These may operate either continuously or on a pulse or A.C. basis.

FIG. 3 illustrates a further embodiment of the invention. In this circuit the input current $I_1$ to be measured is fed through a resistor R4 to a capacitor C3. The potential at the junction of the resistor and the capacitor is applied to the input of an amplifier A5 whose output voltage is fed to an actuating circuit 6. When the signal fed to the unit 6 exceeds a certain value, a relay RL1 is energized and its contact RL1A short circuits the capacitor to earth. The charge in the capacitor is dissipated, the voltage output from the amplifier A5 drops and the contacts RL1A are consequently opened so that the input current $I_1$ again charges the capacitor. The relay RL1 is closed only for sufficient time to discharge the capacitor. In this system, voltage offsets may occur such that the voltage say V2' at which the voltage is closed varies, and further the displacement of V1 with respect to V2 may change, so that the voltage V2 immediately after the relay opens say V'' may also vary. Thus the quantity of charge taken from capacitor C3 through the contacts RL1A is greatly effected by voltage offsets. However, the quantity of charge is capable of exact determination by making use of the equation $$q = C(V2' - V2'')$$

In this way, the input current $I_1$ can be determined precisely independent of voltage offsets.

The embodiment illustrated schematically in FIG. 1 has been developed to employ two current sources, and a detailed circuit of such an arrangement is shown in FIG. 4. The illustrated circuit has been designed as a ramp generator in temperature control equipment, and has three input signal terminals 1, 1' and 1'' which receive signals corresponding to required rates of temperature increase of 10°C, 1°C and 0.1°C per minute respectively. A signal earth terminal $1_E$ is also provided. The terminals 1, 1' and 1'' are connected to the negative input of amplifier A1 by means of resistors R5, R5' and R5'' respectively. The signal earth terminal is connected to the common point of the resistors R5, R5' and R5'' by means of a suppressor circuit consisting of a rectifier VR1 and a resistor R6 in series, a capacitor C5 being connected in parallel with VR1. The signal earth terminal is also connected to the "+" input terminal of amplifier A1 by way of a resistor R7. A zeroing network is also connected to the " +" input terminal of A1. This network consists of a pre-settable potentiometer R8 connected between points at a potential of +16V and −8V, the slider of the potentiometer being connected to A1 by means of a resistor R9, and the −8V terminal being connected to A1 by means of a resistor R10. The amplifier A1 has a feedback capacitor C6 connected between its output and negative input. A resistor R11 couples the output of A1 to the trigger A2, indicated as a dotted outline surrounding the relevant components.

The resistor R11 is connected to a further resistor R12 which in turn in connected to the base electrode of a first trigger (p.n.p) transistor VTI, having an emitter-base biasing resistor R13. The collector and base of VTI are connected to the base and collector respectively of a second trigger (n.p.n) transistor VT2 by respective resistors R14 and R15. VT2 is provided with an emitter-base biasing resistor R16. The energizing current for the trigger circuit A2 is derived from a −8V terminal connected to the emitter of VT2, the emitter of VT1 being earthed. The output of the trigger is taken from the collector of VT2, and is applied to two n.p.n. transistors VT3 and VT4 connected to act as current generators. A pre-settable resistor R17 connects the collector of VT2 to the emitter of transistor VT3, the base of the latter being connected both to the base of VT4, and to a +16V source via a resistor R18. The bases of both transistors VT3 and VT4 are connected via a common resistor R19 to the collector of VT2. A resistor R20 connects the emitter of transistor VT4 to the collector of transistor VT2. The transistor VT3 constitutes a current source connected via resistor R21, and rectifier VR2 to the input of amplifier A1, to feed into the amplifier a current equal and opposite to the current flowing from the input terminals.

Transistor VT4 has its collector connected via a low leakage rectifier VR3, constituting the switch S of FIG. 1, to the input of amplifier A3, indicated by a dotted outline. The amplifier input circuit includes an insulated gate field effect transistor (IGFET) with its source and drain connected to a +16 volt source through resistor R24 and to a −8 volt source, the source of the IGFET being connected to its substrate, and the drain also being connected, by a capacitor C8, to the substrate. The gate electrode of the IGFET is connected to receive the signal from the rectifier VR3 via resistor R23. The + input terminal of the amplifier is connected to a potentiometer R25,R26 which is connected between a +16 volt supply and earth. The output of the amplifier is via resistor R27 to terminal 2. The feedback path of the amplifier is provided by a capacitor C7.

Linearisation of the circuit is effected by positive feedback from the terminal 2 through a network of resistors R28, R22 and R29, all of which are set when making the initial adjustment of the circuit. During the initial adjustment, R8 is set so that in the absence of any signals at the input terminals 1, 1' and 1'', the output of A' is constant. R17 is adjusted to give a suitable ratio (approximately R20/R17) between the collector currents of VT3 and VT4, such that the rate of change of the output at terminal 2 with respect to time is correctly related to the input signal at the terminals 1, 1' and 1''.

The operation of A1 and A2 is essentially the same as described with reference to FIG. 1. When the signal at the junction of R11 and R12 is sufficiently negative, VT1 and VT2 turn on, and the current source transistors VT3 and VT4 are turned on to pass a signal of the order of milliamperes to A1, and a signal of the order of microamperes to VR3. The amplifier A3 operates on the pulses passed by VR3 in a manner comparable to that described with reference to FIG. 1. When the trigger circuit A2 turns off, VT4 is turned off, and this results in the reverse-biasing of VR3 to provide the switching effect required to allow the input of A3 to float.

I claim:

1. An integrating amplifier having an output terminal adapted to constitute a source of reference signals and an input circuit adapted for connection to a source of control signals, wherein a. said input circuit comprises a pulse-width modulator connected to the amplifier by way of a switch which is closed only during the "mark" periods of the modulator and is open during the "space" periods whereby the potential of the amplifier input floats freely during said "space" periods, and b. the modulator is constructed with circuit parameters such that i. the output signal from the modulator is of such a magnitude that the effect of the amplifier offset is negligibly small in comparison with the effect of the modulator signal, and ii. the mark period of the modulator is very small in proportion to its space period and the ratio therebetween is variable through a range of values resulting in driving of the amplifier through its working range.

2. A current measuring circuit comprising an integrating amplifier as claimed in claim 1 in which additionally a. a current input terminal is connected directly to the amplifier input, and b. the output terminal of the amplifier is connected to the input circuit, whereby the reference signals act as control signals and the amplifier seeks an equilibrium condition with the average current output from the integrator equal and opposite to the current from the current input terminal.

3. An integrating amplifier according to claim 1 wherein the output from said pulse width modulator is provided by a constant current generator.

4. An integrating amplifier according to claim 3 wherein said switch is a low-leakage diode.

5. A ramp generator comprising an integrating amplifier according to claim 3 wherein a second constant current generator in said pulse width modulator is connected to feed to said input circuit a signal equal and opposite to said control signal.

6. A ramp generator according to claim 5 wherein said constant current generators are transistors.

* * * * *

UNITED STATES PATENT OFFICE
CERTIFICATE OF CORRECTION

Patent No. 3,720,846 Dated March 13, 1973

Inventor(s) ALAN JOHN BORER

It is certified that error appears in the above-identified patent and that said Letters Patent are hereby corrected as shown below:

[30] Foreign Application Priority Data

June 5, 1970 Great Britain . . . 27283/70

Signed and sealed this 10th day of July 1973.

(SEAL)
Attest:

EDWARD M.FLETCHER,JR.
Attesting Officer

Rene Tegtmeyer
Acting Commissioner of Patents